(12) United States Patent
Wang et al.

(10) Patent No.: US 6,618,469 B2
(45) Date of Patent: Sep. 9, 2003

(54) CIRCUITS AND METHODS FOR TESTING POTS SERVICE

(75) Inventors: Jie Dong Wang, Irvine, CA (US); Christopher S. Smith, Mission Viejo, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 0 days.

(21) Appl. No.: 10/068,687

(22) Filed: Feb. 5, 2002

(65) Prior Publication Data

US 2003/0147507 A1 Aug. 7, 2003

(51) Int. Cl.[7] .............................................. H04M 1/24
(52) U.S. Cl. ...................... 379/1.01; 379/1.03; 379/1.04; 379/24; 379/21; 379/27.01; 379/29.05; 379/30
(58) Field of Search ..................... 379/22.04, 10.01, 379/24, 21, 22.03, 22.05, 27.01, 29.05, 30, 1.01, 1.03, 1.04, 3, 22, 22.01, 22.02, 22.07, 26.01, 27.03, 27.04, 29.1, 29.11

(56) References Cited

U.S. PATENT DOCUMENTS

| | | | | |
|---|---|---|---|---|
| 4,447,679 A | * | 5/1984 | Kojima et al. | 379/29.01 |
| 4,620,069 A | * | 10/1986 | Godwin et al. | 379/1.04 |
| 5,559,854 A | * | 9/1996 | Suzuki | 379/27 |
| 5,598,455 A | * | 1/1997 | Bliven et al. | 379/27 |
| 5,764,727 A | * | 6/1998 | Toumani et al. | 379/27 |
| 5,956,385 A | * | 9/1999 | Soto et al. | 379/27 |
| 6,178,080 B1 | * | 1/2001 | Wilken et al. | 361/119 |
| 6,192,109 B1 | * | 2/2001 | Amrany et al. | 379/30 |
| 6,259,676 B1 | * | 7/2001 | Kellock et al. | 370/248 |
| 6,278,769 B1 | * | 8/2001 | Bella | 379/29.11 |
| 6,301,337 B1 | * | 10/2001 | Scholtz et al. | 379/30 |

* cited by examiner

Primary Examiner—Rexford Barnie
(74) Attorney, Agent, or Firm—Fogg and Associates, LLC; Scott V. Lundberg (57) ABSTRACT

Circuits for testing POTS service on a shared POTS/xDSL carrier include microfilters for selective coupling to the subscriber loop side of an xDSL filter associated with a subscriber line interface circuit. Such configurations facilitate testing of the POTS service using an insertion point that is between the xDSL filter and the subscriber loop in a manner that is transparent to subscribers.

30 Claims, 5 Drawing Sheets

CIRCUITS AND METHODS FOR TESTING POTS SERVICE

TECHNICAL FIELD OF THE INVENTION

The present invention relates generally to telecommunications, and in particular to apparatus and methods to facilitate testing of POTS service.

BACKGROUND OF THE INVENTION

A variety of telecommunication systems utilize traditional telephone company local subscriber loops to carry high rate digital transmissions. Examples include a variety of digital subscriber loop (DSL) services, such as high-rate DSL (HDSL), asymmetric DSL (ADSL), very high-rate DSL (VDSL) and others. The varieties of DSL service will be referred to herein generally as xDSL. The xDSL services share the same carrier with traditional analog telephony, commonly referred to as plain old telephone service (POTS).

With the growth of the xDSL for digital and voice service, a robust line test system is required for maintenance facilities and troubleshooting without interrupting services. When a conventional butt-in test set is switched "off-hook" to test the POTS service on a shared line, the test set can create an impedance change on the subscriber line that interferes with the data signal.

For the reasons stated above, and for other reasons stated below that will become apparent to those skilled in the art upon reading and understanding the present specification, there is a need in the art for alternative apparatus and methods to facilitate testing of POTS service in a shared POTS/xDSL system.

SUMMARY

The various embodiments include microfilters that are selectively coupled to a carrier in a shared POTS/xDSL system on the subscriber loop side of an xDSL filter associated with a subscriber line interface circuit. The various embodiments facilitate testing of the POTS service using an insertion point that is between the xDSL filter and the subscriber loop in a manner that is transparent to subscribers.

For one embodiment, the invention provides a system for testing POTS service on a line shared with xDSL service. The system includes a first microfilter selectively coupled to an xDSL filter on the line through a first relay. The system further includes a second microfilter selectively coupled to the line through a second relay. The first and second relays are on a subscriber loop side of the xDSL filter. The subscriber loop is decoupled from the xDSL filter when the first microfilter is coupled to the xDSL filter and the subscriber loop can remain coupled to the xDSL filter when the second microfilter is coupled to the line.

For another embodiment, the invention provides a telecommunications system. The telecommunications system includes a subscriber line interface circuit, an xDSL transceiver, an xDSL filter coupled between the xDSL transceiver and the subscriber line interface circuit, and a communication line coupling the subscriber line interface circuit and the xDSL transceiver to a load. The telecommunications system further includes a first relay on the communication line between the xDSL filter and the load, a second relay on the communication line between the xDSL filter and the load, a third relay on the communication line between the xDSL filter and the load, a first microfilter coupled to the first relay and a second microfilter coupled to the second relay. The first microfilter is selectively coupled to the subscriber line interface circuit through the first relay and the first relay decouples the load from the subscriber line interface circuit when the first microfilter is coupled to the subscriber line interface circuit. The second microfilter is selectively coupled to the communication line through the second relay, but the second relay does not decouple the load from the subscriber line interface circuit when the second microfilter is coupled to the communication line. The third relay selectively decouples the load from the subscriber line interface circuit for coupling the load to a test port.

For yet another embodiment, the invention provides a method of testing POTS service on a line shared with xDSL service. The method includes coupling a test-in port of a metallic loop test set to a first microfilter and coupling the first microfilter to a subscriber line interface circuit at a point located on a subscriber loop side of an xDSL filter associated with the subscriber loop interface circuit. For a further embodiment, the method further includes coupling a test-out port of the metallic loop test set to a second microfilter, coupling the second microfilter to a subscriber load on the subscriber loop side and detecting whether there is voice traffic on the subscriber loop. For a still further embodiment, the method further includes coupling the test-out port of the metallic loop test set to the subscriber load, bypassing the second microfilter, if no voice traffic is detected on the subscriber loop.

For another embodiment, the invention provides a bridging microfilter for coupling to a ring line and tip line of a POTS/xDSL shared carrier in detection of voice traffic. The bridging microfilter includes a first differential mode inductor in series with a second differential mode inductor, first and second resistors in parallel with the first differential mode inductor, first and second capacitors in parallel with the second differential mode inductor, a first shunt leg interposed between the first and second differential mode inductors and coupled across the first and second differential mode inductors, and a second shunt leg coupled across the second differential mode inductor. The bridging microfilter has an impedance value of approximately 80 k$\Omega$ or higher.

Further embodiments of the invention include apparatus and methods of varying scope.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that logical, electrical or mechanical changes may be made without departing from the scope of the present invention. The following detailed description is, therefore, not to be taken in a limiting sense, and the scope of the present invention is defined only by the appended claims and equivalents thereof.

Routine testing of telecommunications systems is desired to ensure proper operation. In a shared system having POTS service and xDSL service, testing of POTS service is complicated by the need to avoid interference with data transfer across the carrier and to remove the data frequencies from the tested signal.

Testing generally looks for a variety of conditions on the carrier. One example includes looking for capacitance and/or resistance values on subscriber lines going out. Another involves looking for capacitance values on the ringer to see, for example, the number of phones on the line. Testing can detect if bridge taps exist on the carrier. The carrier may also be tested for bandwidth to qualify the carrier for DSL service.

A variety of test sets are available for performing the actual measurements, which are outside the scope of this invention. Such test sets are available from Harris Corporation, Camarillo, Calif., USA. The test sets generally do not want to see xDSL traffic when testing POTS service and components as this complicates or invalidates the measurements.

To avoid xDSL traffic, typical testing of such systems has included insertion of the test set between a subscriber line interface circuit (SLIC) and an associated xDSL filter. This type of testing adequately avoids interference with the data traffic. However, testing at this insertion point may fail to detect problems with the xDSL filter itself.

A more desirable insertion point is on the subscriber loop side of the xDSL filter. However, when a conventional butt-in test set is switched off hook to test the POTS service, it creates an impedance change on the subscriber line that interferes with the data signal. The various embodiments include microfilters that are selectively coupled to the shared carrier on the subscriber loop side of the xDSL filter associated with the SLIC. The various embodiments facilitate testing of the POTS service using an insertion point that is between the xDSL filter and the subscriber loop in a manner that is transparent to subscribers.

Figure 1:
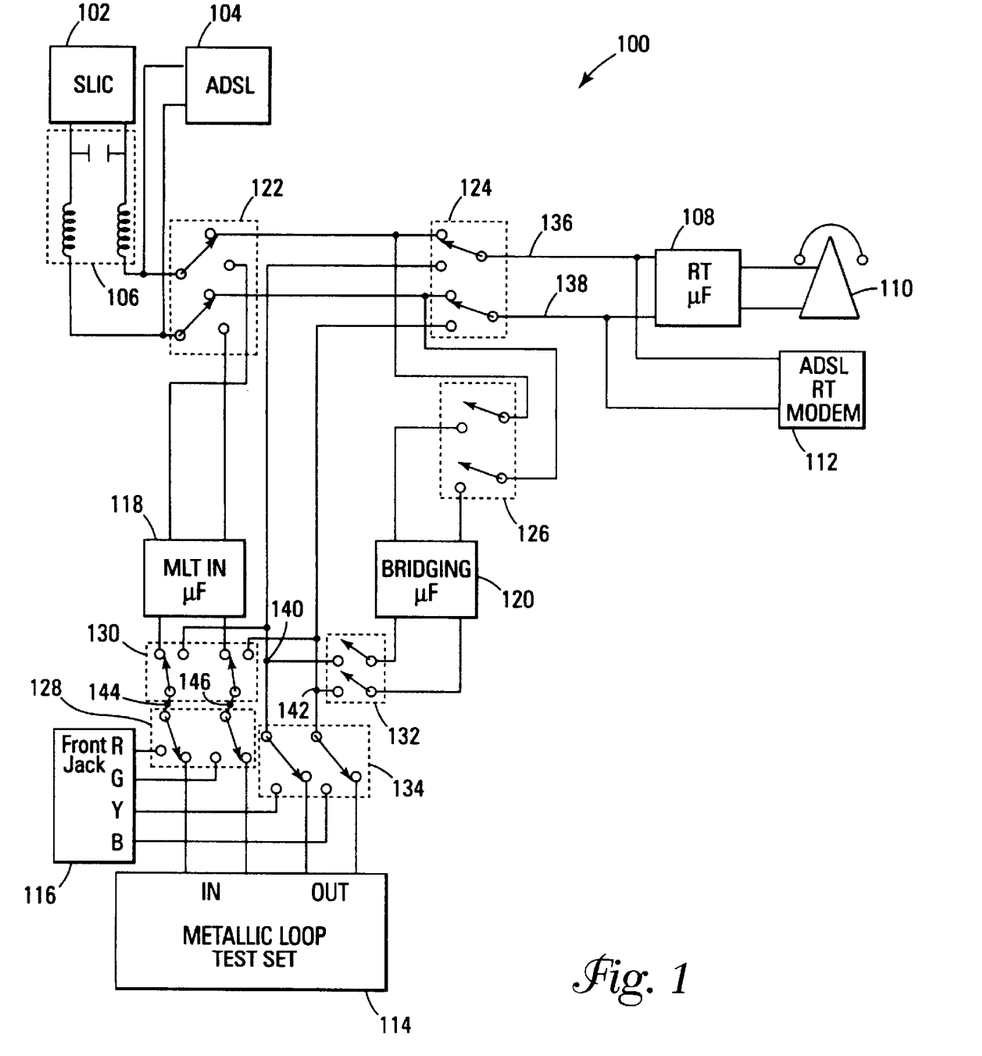
FIG. 1 is a telecommunications system in accordance with an embodiment of the invention.

FIG. 1 is a telecommunications system 100 in accordance with an embodiment of the invention. The system 100 provides POTS and xDSL service over a common carrier. For one embodiment, the xDSL service of the system 100 is ADSL service, but other DSL services are similarly applicable.

The system 100 includes a subscriber line interface circuit (SLIC) 102 for generating the POTS signals on the central office side and an xDSL transceiver unit 104 for generating the xDSL signals on the central office side. The system 100 further includes a remote terminal microfilter 108 for removing the xDSL signals from the tip line 136 and ring line 138 prior to supplying the POTS signals to the customer equipment, such as the ringer or phone 110. The system 100 further includes a remote terminal xDSL modem 112. The remote terminal microfilter 108, ringer 110 and xDSL modem 112 may be referred to as a subscriber load.

An xDSL filter 106 is associated with the SLIC 102 to filter the xDSL traffic from the carrier. In normal operation, a relay 122 and a relay 124 couple the SLIC 102 to the subscriber load across a communication line or carrier, i.e., the tip line 136 and ring line 138. It is noted that a carrier of xDSL service typically involves a number of channels, e.g., 24. A relay 122 and relay 124 are preferably associated with each channel in a one-to-one relationship.

The relay 122 is located on the subscriber loop side of the xDSL filter 106. The relay 122 can be used to couple the SLIC 102 and its associated xDSL filter 106 to either the subscriber load in normal operation or to a microfilter 118 for testing. The microfilter 118, which may be referred to as a metallic loop test (MLT) IN microfilter, preferably has an impedance value substantially equal to an impedance value of the xDSL filter 106. For one embodiment, the microfilter 118 has an impedance value of approximately 900Ω at 1 kHz. The relay 122 includes a first switching device for coupling a tip line of the xDSL filter 106 to a tip line of the microfilter 118 or the tip line 136. The relay 122 further includes a second switching device for coupling a ring line of the xDSL filter 106 to a ring line of the microfilter 118 or the ring line 138. While there is preferably one relay 122 for each channel of the carrier, there need only be one microfilter 118. The microfilter 118 can be coupled to the xDSL filter 106 of the desired channel through activation of its associated relay 122 while all other relays 122 remain in their normal states.

The relay 124 is located between the subscriber loop and the relay 122. The relay 124 includes a first switching device for either maintaining the continuity of the tip line 136 of the carrier between the subscriber load and the SLIC 102 or coupling the tip line 136 to a node 140. The relay 124 further includes a second switching device for either maintaining the continuity of the ring line 138 of the carrier between the subscriber load and the SLIC 102 or coupling the ring line 138 to a node 142.

A microfilter 120, which may be referred to as a bridging microfilter, is interposed between the carrier (tip line 136 and ring line 138) and the nodes 140, 142. A tip line of the microfilter 120 is selectively coupled to the tip line 136 through a first switching device of relay 126. Similarly, a ring line of the microfilter 120 is selectively coupled to the ring line 138 through a second switching device of relay 126. The system 100 is designed to permit coupling the microfilter 120 to the carrier during use, i.e., voice and/or data traffic may be present on the carrier. Accordingly, the microfilter 120 preferably has an impedance value significantly greater than the impedance value of the xDSL filter 106 to avoid noticeable changes in the impedance of the carrier as seen by a subscriber. As an example, the microfilter 120 may have an impedance value of two or more orders of magnitude greater than the impedance value of the xDSL filter 106. For one embodiment, the microfilter 120 has an impedance value of 80 kΩ or greater. For another embodiment, the microfilter 120 has an impedance value of approximately 100 kΩ. As with the relays 122 and 124, there is preferably one relay 126 for each channel of the carrier. As with the microfilter 118, only one microfilter 120 is needed to test each channel if testing is carried out individually for each channel.

The tip line of the microfilter 120 is selectively coupled to the node 140 through a first switching device of relay 132. The ring line of the microfilter.120 is selectively coupled to the node 142 through a second switching device of relay 132. The nodes 140 and 142 may be accessed for testing as will be described later.

A node 144 may be coupled to either the node 140 or to the tip line of the microfilter 118 through a first switching device of relay 130. A node 146 may be coupled to either the node 142 or to the ring line of the microfilter 118 through a second switching device of relay 130. The nodes 144 and 146 may be accessed for testing as will be described later.

For the embodiment depicted in FIG. 1, the telecommunications system 100 is adapted to allow testing and observation either through a butt-in test set, such as the metallic loop test set 114, or through a jack 116, such as a standard RJ11 jack. The node 140 may be coupled to either a first lead of a test-out port of the test set 114 or a first lead of one pair of leads of the jack 116 through a first switching device of the relay 134. The node 142 may be coupled to either a second lead of the test-out port of the test set 114 or a second lead of the pair of leads of the jack 116 through a second switching device of the relay 134. The first and second leads of the first pair of leads of the jack 116 and the tset-out port of the test set 114 may correspond to tip and ring lines, respectively.

The node 144 may be coupled to either a first lead of a test-in port of the test set 114 or a first lead of another pair of leads of the jack 116 through a first switching device of the relay 128. The node 146 may be coupled to either a second lead of the test-in port of the test set 114 or a second lead of the pair of leads of the jack 116 through a second switching device of the relay 128. The first and second leads of this pair of leads of the jack 116 and the test-in port of the test set 114 may also correspond to tip and ring lines, respectively.

While the embodiment depicted in FIG. 1 permits testing and observation through more than one device connection, there is no requirement for this level of flexibility. For example, if only a standard butt-in test configuration is desired, relays 128 and 134 may be eliminated, allowing the leads of the test set 114 to couple directly to the nodes 140, 142, 144 and 146.

FIG. 1 depicts the normal states of the relays 122, 124, 126, 128, 130, 132 and 134 for one embodiment of the invention. In this configuration, the microfilters 118 and 120 are not coupled to the carrier during normal operation. This avoids interference with the data traffic. By changing the states of one or more of the relays, various testing can be accomplished using butt-in or other test sets.

One test is termed a bridging test. In this configuration, a test set can be connected to the carrier without breaking the line. The function of the test is generally to look for voice traffic to determine whether additional testing may be performed; it is generally undesirable to conduct certain testing if a subscriber is using the line. To perform the bridging test with the test set 114 of the telecommunications system 100 of FIG. 1, relays 126 and 132 are changed to a second state to connect the tip line 136 and ring line 138 to nodes 140 and 142, respectively, through the microfilter 120. The relay 134 remains in its normal state to couple the nodes 140 and 142 to leads of the test-out port of the test set 114 corresponding to a tip line and ring line, respectively. Because the microfilter 120 has a high impedance, voice traffic may be detected by the test set 114 without causing a deterioration of the line impedance. If it is desired to perform the testing through the jack 116, the relay 134 may be changed to a second state to connect nodes 140 and 142 to a pair of leads of the jack 116, e.g., the Y and B leads, respectively.

Another test is a calibration test. This test is generally used to compensate for the length of line between the test set and the carrier, i.e., to allow the test set to determine and mathematically remove the length of line from its measurements. For this test, the relay 130 is changed to a second state to connect the test-in port of the test set 114 to the test-out port of the test set 114 through nodes 140 and 142.

A further test is a looking out test. This test gives the copper loop to the tester, bypassing the microfilters 118 and 120 and the xDSL filter 106 to test the subscriber side of the carrier. This testing typically is looking at the carrier for foreign voltages, hazardous voltages, noise, shorts, opens, AC currents, and large capacitance values for tip-to-ring, tip-to-ground or ring-to-ground. This testing can also be used to detect load coils and bridge taps on the carrier. Because such testing is focused on the subscriber loop side, it is desirable to bypass all filtering outside of the subscriber load. To perform the looking out test with the test set 114, the relay 124 is changed to a second state to couple the tip line 136 and ring line 138 on the subscriber loop side of the carrier directly to the leads of the test-out port of the test set 114 corresponding to the tip line and ring line, respectively. If it is desired to perform the testing through the jack 116, the relay 134 may be changed to a second state to connect nodes 140 and 142 to a pair of leads of the jack 116, e.g., the Y and B leads, respectively.

A still further test is a looking in test. This test looks for the subscriber voltage, e.g., 48V, looking into the SLIC 102. The configuration permits a test set to go off hook and dial a test number to run voice tests through the SLIC 102 looking in. To perform the looking in test with the test set 114, the relay 122 is changed to a second state to couple the xDSL filter 106 and xDSL transceiver 104 to a tip line and ring line of the microfilter 118 instead of the tip line 136 and ring line 138 on the subscriber loop side. The relays 128 and 130 remain in their normal state to couple the tip line and ring line of the microfilter 118 to leads of the test-in port of the test set 114 corresponding to the tip line and ring line, respectively. To perform the testing through the jack 116, the relay 128 may be changed to a second state to couple nodes 144 and 146 to a pair of leads of the jack 116, e.g., the R and G leads, respectively.

Figure 2:
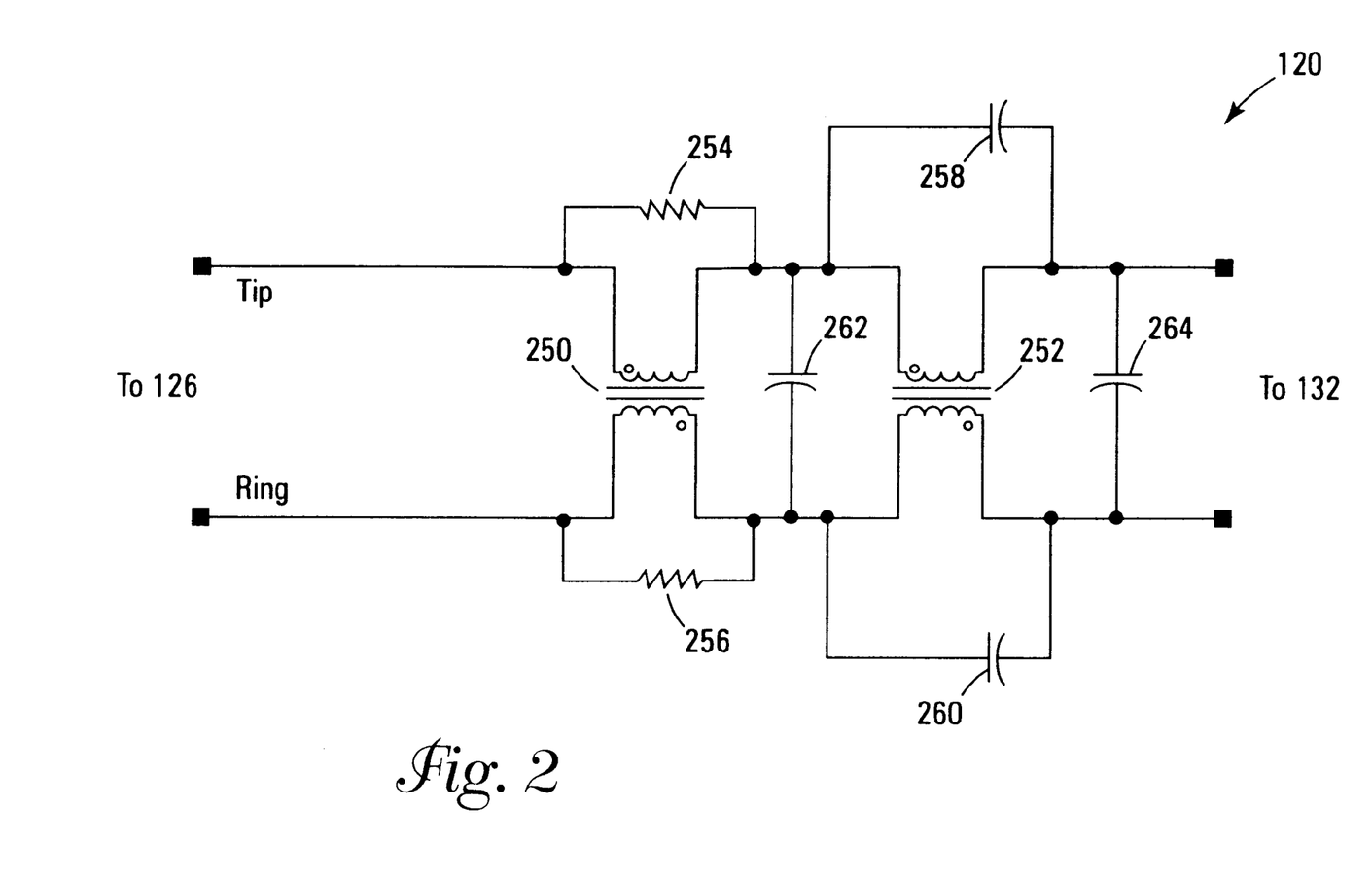
FIG. 2 is a detailed schematic of one embodiment of a bridging microfilter in accordance with the invention.

As discussed previously, the bridging microfilter 120 should have a high impedance value. FIG. 2 is a detailed schematic of one embodiment of a bridging microfilter in accordance with the invention. The bridging microfilter 120 of FIG. 2 includes series-connected differential mode inductors 250 and 252. For one embodiment, the inductors 250 and 252 have impedance values in the range of approximately 5 mH to approximately 25 mH. For a further embodiment, the inductor 250 has an inductance value of approximately 9.6 mH and the inductor 252 has an inductance value of approximately 21 mH.

Inductor 250 is further coupled to resistors 254 and 256, which are coupled across the tip lines and ring lines, respectively. The resistors 254 and 256 are in parallel with separate windings of the inductor 250. Inductor 252 is further coupled to capacitors 258 and 260, which are coupled across the tip lines and ring lines, respectively. The capacitors 258 and 260 are in parallel with separate windings of the inductor 252.

For one embodiment, the parallel resistor 254 and the parallel resistor 256 have substantially the same resistance. For a further embodiment, the parallel resistors 254 and 256 have resistance values greater than approximately 3.9 kΩ. For a still further embodiment, the parallel resistors 254 and 256 further have resistance values of approximately 4.75 kΩ. For a one embodiment, the parallel capacitor 258 and the parallel capacitor 260 have substantially the same capacitance. For a further embodiment, the parallel capacitors 258 and 260 have capacitance values greater than approximately 1800 pF. For a still further embodiment, the parallel capacitors 258 and 260 capacitance values of approximately 2200 pF.

Shunt legs may be inserted between the tip and ring lines of the bridging microfilter 120. For one embodiment, shunt capacitor 262 may be interposed between the inductor 250 and the inductor 252 and coupled between the tip and ring lines, e.g., between the separate windings of the inductors 250 and 252. Similarly, shunt capacitor 264 may be interposed between the inductor 252 and the relay 132 and coupled between the tip and ring lines, e.g., between the windings of the inductor 252.

For one embodiment, the capacitor 262 has a higher capacitance than the capacitor 264. For a further embodiment, the capacitors 262 and 264 have capacitance values of approximately 0.07 $\mu$F or less. In one example embodiment, capacitor 262 may have a capacitance value of approximately 0.068 $\mu$F and the capacitor 264 may have a capacitance value of approximately 0.033 $\mu$F.

Figure 3:
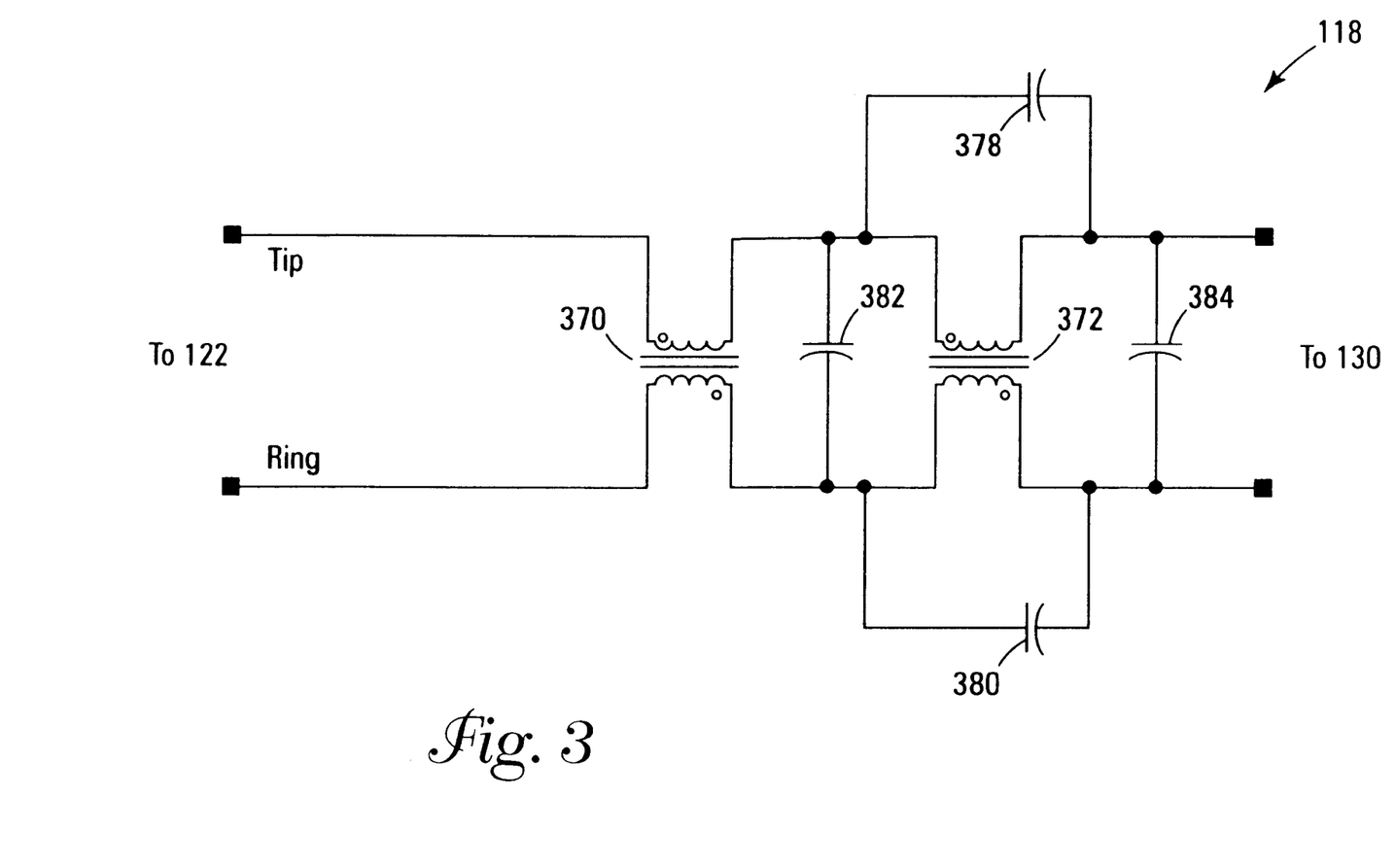
FIG. 3 is a detailed schematic of one embodiment of an MLT IN microfilter for use with the invention.

The MLT IN microfilter 118 preferably has an impedance value matched to a low impedance test-in port of a standard test set, e.g., 900$\Omega$. FIG. 3 is a detailed schematic of one embodiment of an MLT IN microfilter for use with the invention. The MLT IN microfilter 118 of FIG. 3 includes series-connected differential mode inductors 370 and 372. For one embodiment, the inductors 370 and 372 have impedance values in the range of approximately 5 mH to approximately 25 mH. For a further embodiment, the inductor 370 has an inductance value of approximately 18 mH and the inductor 372 has an inductance value of approximately 9.6 mH.

Inductor 372 is further coupled to capacitors 378 and 380, which are coupled across the tip lines and ring lines, respectively. The capacitors 378 and 380 are in parallel with separate windings of the inductor 372. For a one embodiment, the parallel capacitor 378 and the parallel capacitor 380 have substantially the same capacitance. For a further embodiment, the parallel capacitors 378 and 380 have capacitance values greater than approximately 0.0047 $\mu$F. For a still further embodiment, the parallel capacitors 378 and 380 have capacitance values of approximately 0.0056 $\mu$F.

Shunt legs may be inserted between the tip and ring lines of the MLT IN microfilter 118. For one embodiment, shunt capacitor 382 may be interposed between the inductor 370 and the inductor 372 and coupled between the tip and ring lines, e.g., between the separate windings of the inductors 370 and 372. Similarly, shunt capacitor 384 may be interposed between the inductor 372 and the relay 130 and coupled between the tip and ring lines, e.g., between the windings of the inductor 372.

For one embodiment, the capacitor 382 and capacitor 384 have substantially equal capacitance values. For a further embodiment, the capacitors 382 and 384 have capacitance values greater than approximately 0.033 $\mu$F. In one example embodiment, capacitors 382 and 384 have capacitance values of approximately 0.047 $\mu$F.

One difficulty of applying a microfilter in the subscriber line is that the high input capacitance of the microfilter may affect the subscriber line tests performed by the test set, especially with long subscriber loops. The various embodiments resolve this problem by isolating the microfilters from the line with a relay during normal operation. The microfilters are tied to the line only when needed to detect the voice signal. There are two microfilters applied in the various embodiments. One microfilter, i.e., microfilter 118, corresponds to a low impedance test-in port of a test set, e.g., a 900$\Omega$ port, and the other microfilter, i.e., microfilter 120, corresponds to a high impedance test-out port of the test set, e.g., a 100 k$\Omega$ test-out port. The microfilter 120 in accordance with the embodiments of the invention is able to interface with the high impedance test-in port of a typical test set with good insertion loss and attenuation in both the voice band and the xDSL band.

Figure 4:
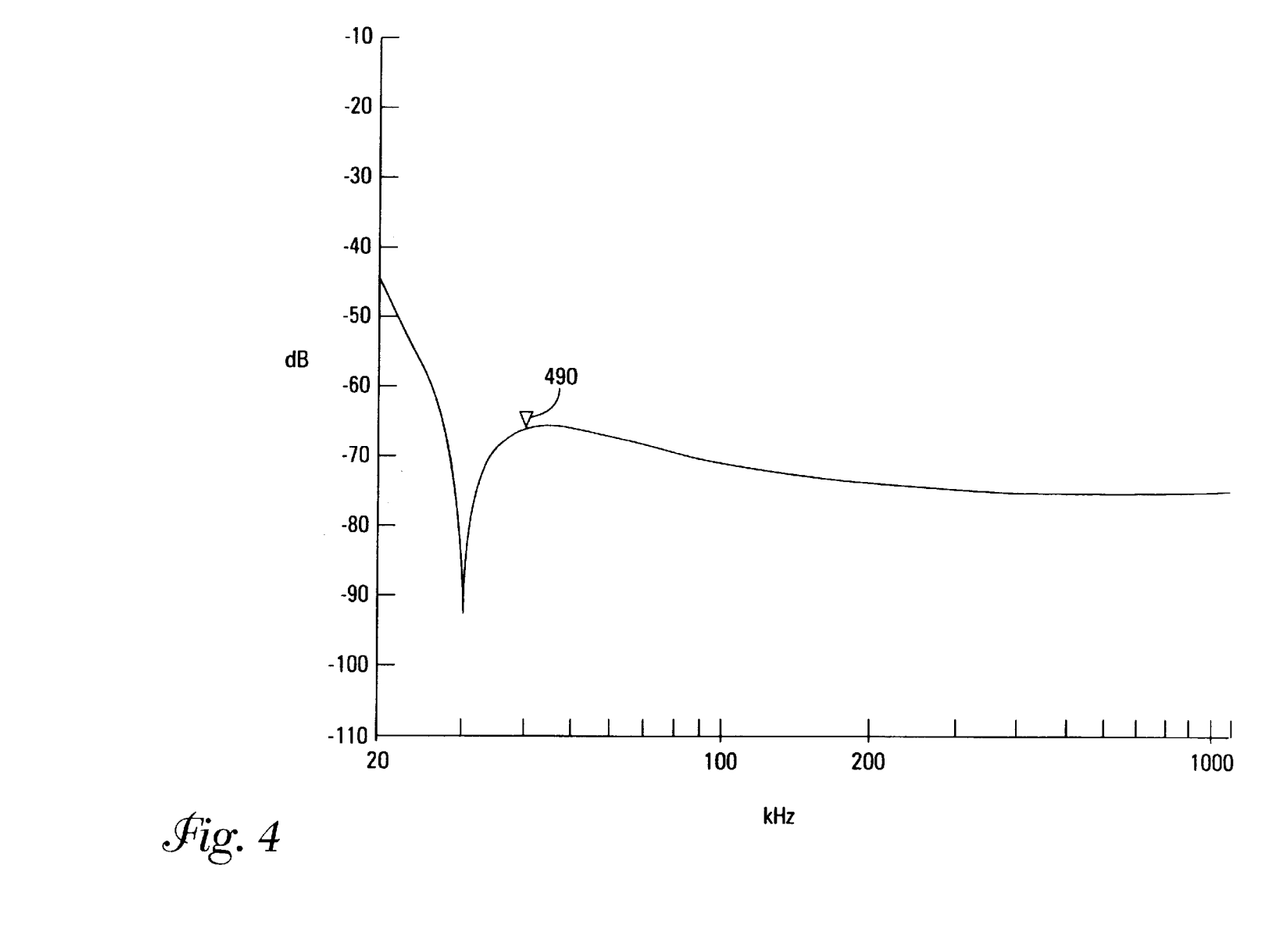
FIG. 4 is a Gain/Loss frequency response plot obtained from lab testing for an example embodiment of an MLT IN microfilter for use with the invention.
Figure 5:
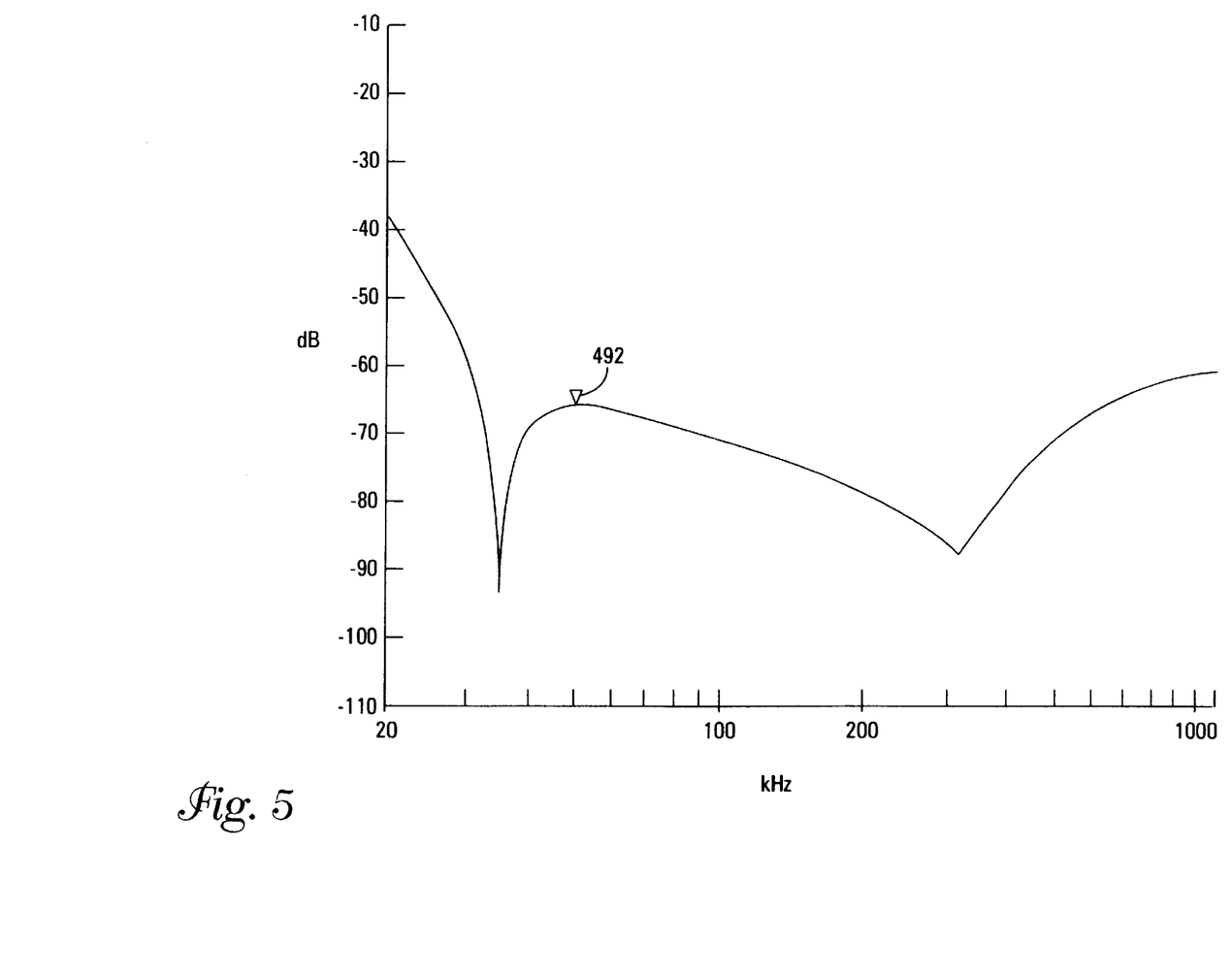
FIG. 5 is a Gain/Loss frequency response plot obtained from lab testing for an example embodiment of a bridging microfilter in accordance with the invention.

FIGS. 4 and 5 are Gain/Loss frequency response plots obtained from lab testing for example embodiments of the microfilter 118 and microfilter 120, such as those depicted in FIGS. 2 and 3, respectively. We can find that for the xDSL band, the attenuation is greater than 60 dB, meeting or exceeding requirements for standard test sets. The peak 490 in FIG. 4 corresponds to approximately 66.3 dB of attenuation at approximately 40.8 kHz while the peak 492 in FIG. 5 corresponds to approximately 65.6 dB of attenuation at approximately 49.1 kHz. Test results of insertion loss are equal to or less than 0.2 dB and test results of voice band attenuation are equal to or less than 1.2 dB. Such values of insertion loss and voice band attenuation similarly meet or exceed requirements for standard test sets.

CONCLUSION

A desirable insertion point for testing of a shared POTS/xDSL carrier is on the subscriber loop side of an xDSL filter associated with a SLIC. However, when a conventional butt-in test set is switched off hook to test the POTS service, it can create an impedance change on the subscriber line that interferes with the data signal. The various embodiments include microfilters that are selectively coupled to the shared carrier on the subscriber loop side of the xDSL filter. The various embodiments facilitate testing of the POTS service using an insertion point that is between the xDSL filter and the subscriber loop in a manner that is transparent to subscribers.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. For example, while relays are depicted for making the various couplings, any coupling device capable of selectively establishing electrical communication among the desired connections may be used. Accordingly, this application is intended to cover any such adaptations or variations of the invention. It is manifestly intended that this invention be limited only by the following claims and equivalents thereof.

What is claimed is:

1. A system for testing POTS service on a line shared with xDSL service, the system comprising:
   a first microfilter selectively coupled to an xDSL filter on the line through a first relay; and
   a second microfilter selectively coupled to the line through a second relay;
   wherein the first and second relays are on a subscriber loop side of the xDSL filter;
   wherein the subscriber loop is decoupled from the xDSL filter when the first microfilter is coupled to the xDSL filter; and
   wherein the subscriber loop can remain coupled to the xDSL filter when the second microfilter is coupled to the line.

2. The system of claim 1, wherein the first microfilter has an impedance value approximately equal to an impedance value of the xDSL filter.

3. The system of claim 1, wherein the first microfilter has an impedance value of approximately 900Ω.

4. The system of claim 1, wherein the second microfilter has an impedance value greater than approximately 80 kΩ.

5. The system of claim 1, wherein the second microfilter has an impedance value of at least approximately 100 kΩ.

6. The system of claim 1, wherein the xDSL service is selected from the group consisting of digital subscriber loop (DSL) service, high-rate DSL (HDSL) service, asymmetric DSL (ADSL) service and very high-rate DSL (VDSL) service.

7. The system of claim 1, wherein the xDSL service is asymmetric DSL (ADSL) service.

8. A telecommunications system, comprising:
a subscriber line interface circuit;
an xDSL transceiver;
a communication line coupling the subscriber line interface circuit and the xDSL transceiver to a load;
an xDSL filter on the communication line between the xDSL transceiver and the subscriber line interface circuit;
a first relay on the communication line between the xDSL filter and the load;
a second relay on the communication line between the xDSL filter and the load;
a third relay on the communication line between the xDSL filter and the load;
a first microfilter coupled to the first relay; and
second microfilter coupled to the second relay;
wherein the first microfilter is selectively coupled to the subscriber line interface circuit through the first relay;
wherein the first relay decouples the load from the subscriber line interface circuit when the first microfilter it coupled to the subscriber line interface circuit;
wherein the second microfilter is selectively coupled to the communication line through the second relay;
wherein the second relay does not decouple the load from the subscriber line interface circuit when the second microfilter is coupled to the communication line; and
wherein the third relay selectively decouples the load from the subscriber line interface circuit for coupling the load to a test port.

9. The telecommunications system of claim 8, wherein the load further comprises a remote terminal microfilter coupled between a subscriber loop and the communication line and an xDSL modem coupled to the communication line.

10. The telecommunications system of claim 8, wherein the second microfilter has an impedance value approximately two orders of magnitude greater than an impedance value of the first microfilter.

11. The telecommunications system of claim 8, wherein the second microfilter has an impedance value greater than approximately 80 kΩ.

12. The telecommunications system of claim 8, wherein the second microfilter has an impedance value of at least approximately 100 kΩ.

13. The telecommunications system of claim 12, wherein the first microfilter has an impedance value of approximately 900Ω.

14. The telecommunications system of claim 8, wherein the first microfilter has an impedance value substantially equal to an impedance value of the xDSL filter.

15. The telecommunications system of claim 8, wherein the first microfilter has an impedance value of approximately 900Ω.

16. A telecommunications system, comprising:
mean s for coupling a subscriber line interface circuit to a first microfilter or a subscriber load, wherein such means is located on a subscriber loop side of an xDSL filter coupled to the subscriber line interface circuit;
means for coupling the subscriber load to the subscriber line interface circuit or a test port; and
means for selectively coupling a second microfilter to the subscriber line interface circuit and the subscriber load.

17. The telecommunications system of claim 16, further comprising:
means for selectively coupling the first microfilter to a first port of a metallic loop test set;
means for selectively coupling the second microfilter to a second port of the metallic loop test set; and
means for selectively coupling the first port of the metallic loop test set to the second port of the metallic loop test set.

18. The telecommunications system of claim 17, further comprising:
means for selectively coupling the first microfilter to a first pair of leads of an RJ11 jack; and
means for selectively coupling the second microfilter to a second pair of leads of the RJ11 jack.

19. The telecommunications system of claim 16, wherein the first microfilter has an impedance value of approximately 900Ω and the second microfilter has an impedance value of approximately 80 kΩ or higher.

20. The telecommunications system of claim 16, wherein the means for selectively coupling the second microfilter to the subscriber line interface circuit and the subscriber load is located between the subscriber load and the means for coupling the subscriber line interface circuit to the first microfilter or the subscriber load.

21. A method of testing POTS service on a line shared with xDSL service, the method comprising:
coupling a test-in port of a metallic loop test set to a first microfilter; and
coupling the first microfilter to a subscriber line interface circuit at a point located on a subscriber loop side of an xDSL filter associated with the subscriber loop interface circuit.

22. The method of claim 21, wherein coupling comprises coupling a ring line to a ring line and coupling a tip line to a tip line.

23. The method of claim 21, wherein coupling the first microfilter to the subscriber line interface circuit concurrently decouples the subscriber line interface circuit from the subscriber loop.

24. The method of claim 21, further comprising:
coupling a test-out port of the metallic loop test set to a second microfilter;
coupling the second microfilter to a subscriber load on the subscriber loop side; and
detecting whether there is voice traffic on the subscriber loop.

25. The method of claim 24, further comprising:
coupling the test-out port of the metallic loop test set to the subscriber load, bypassing the second microfilter, if no voice traffic is detected on the subscriber loop.

26. A method of testing POTS service on a line shared with xDSL service, the method comprising:
coupling a first pair of leads of an RJ11 jack to a microfilter;

coupling the microfilter to a subscriber line interface circuit at a point located on a subscriber loop side of an xDSL filter associated with the subscriber loop interface circuit; and decoupling the subscriber loop from the xDSL filter.

27. The method of claim 26, further comprising:

coupling a second pair of leads of the RJ11 jack to a second microfilter;

coupling the second microfilter to a subscriber load on the subscriber loop side; and detecting whether there is voice traffic on the subscriber loop.

28. The method of claim 27, further comprising:

coupling the second pair of leads of the RJ11 jack to the subscriber load, bypassing the second microfilter, if no voice traffic is detected on the subscriber loop.

29. A telecommunications system, comprising:

a subscriber line interface circuit having a ring line and a tip line;

an xDSL transceiver having a ring line and a tip line;

an xDSL filter having a ring line coupled between the ring line of the xDSL transceiver and the ring line of the subscriber line interface circuit and having a tip line coupled between the tip line of the xDSL transceiver and the tip line of the subscriber line interface circuit;

a first segment of carrier having a ring line and a tip line;

a second segment of carrier having a ring line and a tip line coupled to a subscriber loop;

a first switching device located between the xDSL filter and the first segment of carrier for coupling the ring line of the xDSL filter to either the ring line of the first segment of carrier or a ring line of a first microfilter;

a second switching device located between the xDSL filter and the first segment of carrier for coupling the tip line of the xDSL filter to either the tip line of the first segment of carrier or a tip line of the first microfilter;

a third switching device for coupling the ring line of the second segment of carrier to either the ring line of the first segment of carrier or a first node;

a fourth switching device for coupling the tip line of the second segment of carrier to either the tip line of the first segment of carrier or a second node;

a fifth switching device for selectively coupling the ring line of the first segment of carrier to a ring line of a second microfilter;

a sixth switching device for selectively coupling the tip line of the first segment of carrier to a tip line of the second microfilter;

a seventh switching device for selectively coupling the ring line of the second microfilter to the first node;

an eighth switching device for selectively coupling the tip line of the second microfilter to the second node;

a ninth switching device for coupling a third node to either the ring line of the first microfilter or the first node; and a tenth switching device for coupling a fourth node to either the tip line of the first microfilter or the second node;

wherein the first microfilter is coupled between the first and second switching devices and the ninth and tenth switching devices; and wherein the second microfilter is coupled between the third and fourth switching devices and the fifth and sixth switching devices.

30. The telecommunications system of claim 29, further comprising:

an eleventh switching device for coupling the first node to either a ring line of a first pair of leads of an RJ11 jack or a ring line of a test-out port of a metallic loop test set;

a twelfth switching device for coupling the second node to either a tip line of the first pair of leads of the RJ11 jack or a tip line of the test-out port of the metallic loop test set;

a thirteenth switching device for coupling the third node to either a ring line of a second pair of leads of the RJ11 jack or a ring line of a test-in port of the metallic loop test set; and a fourteenth switching device for coupling the fourth node to either a tip line of the second pair of leads of the RJ11 jack or a tip line of the test-in port of the metallic loop test set.

* * * * *